(12) United States Patent
Tu

(10) Patent No.: US 6,450,650 B1
(45) Date of Patent: Sep. 17, 2002

(54) PROJECTOR WITH IMAGE SOURCE FROM OBJECTS

(76) Inventor: Yu Ta Tu, 3Fl., No. 563, Sec. 1, Peishin Rd., Chutung, Hsinchu Hsien (TW)

( * ) Notice: Subject to any disclaimer, the term of this patent is extended or adjusted under 35 U.S.C. 154(b) by 124 days.

(21) Appl. No.: 09/657,441

(22) Filed: Sep. 7, 2000

(51) Int. Cl.[7] .................. G03B 21/14; G03B 21/18; G03B 21/08; G03B 21/06; G03B 23/00
(52) U.S. Cl. .................. 353/119; 353/57; 353/64; 353/66; 353/99; 353/103
(58) Field of Search .............. 353/22, 30, 57, 353/58, 59, 63, 103, 104, 119, 120, 122, 9, 98, 99, 64, 65, 66, DIG. 4, DIG. 3

(56) References Cited

U.S. PATENT DOCUMENTS 4,313,675 A * 2/1982 Ackeret ............... 355/40
RE32,371 E * 3/1987 Lamb ................... 40/361
4,693,373 A * 9/1987 Lamb et al. ............ 209/3.3
4,875,064 A * 10/1989 Umeda et al. .......... 353/78

* cited by examiner

Primary Examiner—Russell Adams
Assistant Examiner—Melissa Koval
(74) Attorney, Agent, or Firm—Pro-Techtor International Services

(57) ABSTRACT

A projector capable of throwing image on a screen from objects, the project comprising a base including a plurality of mirrors, a rear slanted plate hinged to the base, a lens in the front board, an object receiving drawer, and a cover; an angle adjustment means on the outside of the rear slanted plate; a light source; a housing shaped; and a cooling means. Image of object is reflected on mirror and lens. A clear image is obtained by turning the focusing knob. Further bias the rear slanted plate for adjusting the angle of thereof so as to obtain a better angle of the lens for enhancing focus.

9 Claims, 6 Drawing Sheets

PROJECTOR WITH IMAGE SOURCE FROM OBJECTS

FIELD OF THE INVENTION

The present invention relates to projectors and more particularly to a projector having improved characteristics such as with image source from objects in addition to paper, color film, and transparent slide.

BACKGROUND OF THE INVENTION

A conventional projector is shown in FIG. 1 comprising a light source 10, a reflection mirror 11 for reflecting light emitted from light source 10, a focusing lens 12 for bringing together light from reflection mirror 11 to pass through an image source (e.g., transparent slide) 13, and a projecting lens 14 for reflecting light from transparent slide 13 and throwing the image of the transparent slide 13 on a screen 15. Such transparent slide 13 is usually made of plastic material. Also, transparent slides 13 are applicable to liquid crystal based projection plate.

However, the conventional projector, irrespective of the slide being color or black-white, suffered from a number of disadvantages as detailed below.
1. It is time consuming and expensive for producing transparent slides because data is required to copied on slide in advance.
2. The transparency of color slide is poor. This adversely affects the color of image.
3. The proposal of waste transparent slides is a burden to the environment.
4. As to liquid crystal based projection plate, it is expensive and poor in color and contrast.
5. There is a diffusion loss when light transmitted from light source to projecting lens.
6. There is a superposition effect on the projected image on screen due to the projection of diffused light thereon. This causes a poor image contrast.
7. Viewer may suffer eye fatigue after viewing the image on screen for a relatively long time.
8. It is impossible to project an object.

Thus, it is desirable to provide an improved projector with image source from objects in order to overcome the above drawbacks of prior art.

SUMMARY OF THE INVENTION

It is an object of the present invention to provide a projector capable of throwing image on a screen from objects, the project comprising a base including a mirror on either side, two second small mirrors on both top and bottom sides of each mirror, small mirror being at an oblique angle with respect to mirror, a rear slanted plate with lower portion hinged to the bottom plate of base such that the rear slanted plate may pivot about the hinge, a third mirror on the inner surface of the rear slanted plate, a lens in the front board, an arcuate heat resistant plate above the lens, a drawer in the receiving space of the base for putting object(s) therein, and a cover hinged on the front board of base; an angle adjustment means on the outside of the rear slanted plate for adjusting the angle of the rear slanted plate with respect to base including an elongate shaft with both ends passed through the sides of base, a turning member pivotably put on the shaft having an arcuate recess, and a short shaft passed through the arcuate recess having both ends attached to the outer surface of the rear slanted plate; a light source on the upper portion of base for emitting light which is concentrated on the side mirrors of the base; a housing shaped to conform with base so as to cover the projector; and a cooling means on the rear board of housing wherein object is put on the drawer which is inserted in the receiving space of base from opening, the image of object is reflected on third mirror, the image is further reflected on lens in the front board of base, by turning the focusing knob associated with the lens for obtaining a clear image on the screen; and pivot the turning member toward short shaft in order to bias the rear slanted plate for adjusting the angle of the rear slanted plate so as to obtain a better angle of the lens for enhancing focus.

It is another object of the present invention to provide a projector further comprising a ventilation opening on either side of the base, two second ventilation openings on the front side of the base, and three sets of ventilation slots on the housing corresponding to the ventilation openings provided on two side boards and top board of housing respectively. With this, it is made possible to effectively dissipate heat generated in use so as to maintain the normal operation of projector.

The above and other objects, features and advantages of the present invention will become apparent from the following detailed description taken with the accompanying drawings.

DETAILED DESCRIPTION OF THE PREFERRED EMBODIMENTS

Figure 2:
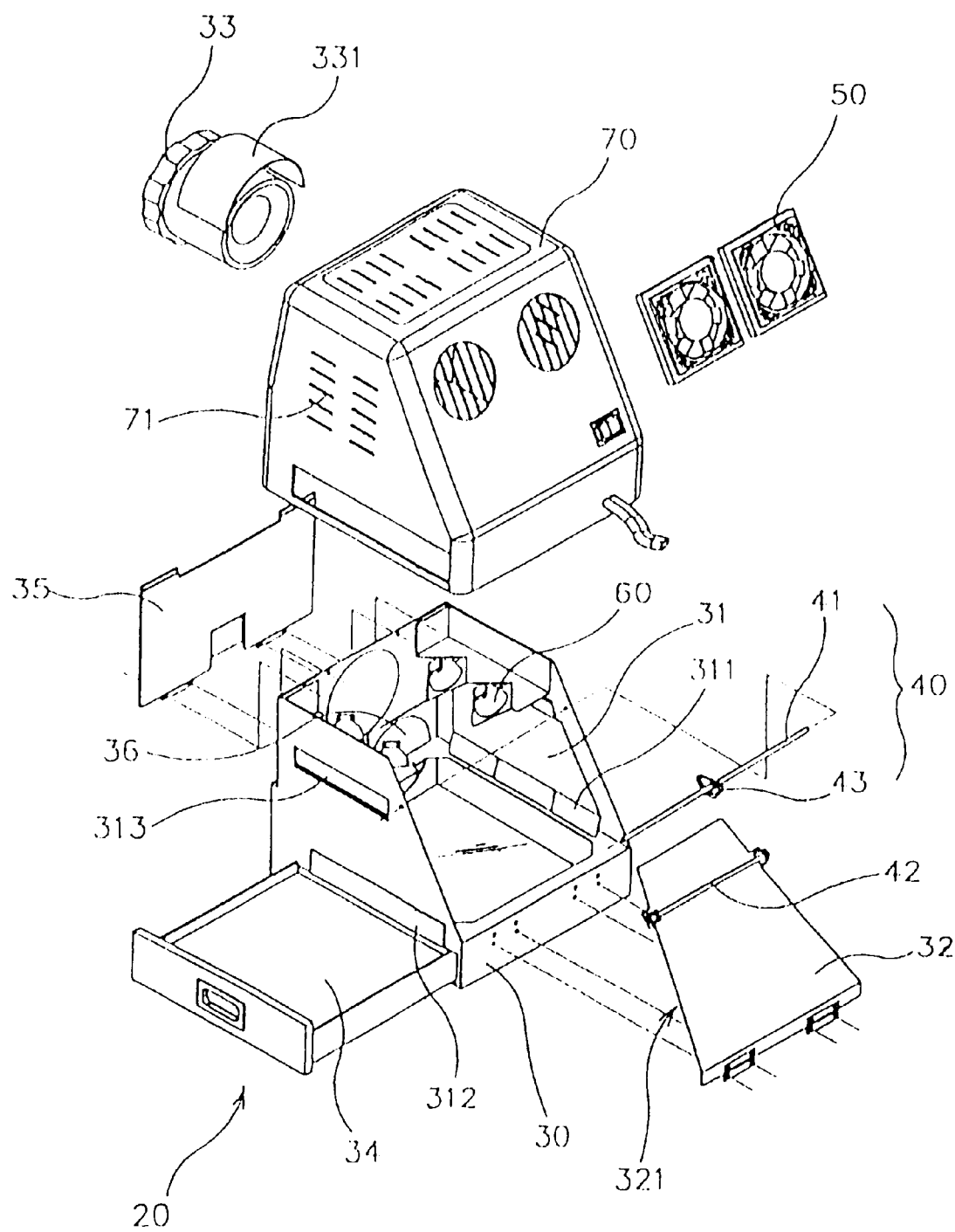
FIG. 2 is an exploded view of a preferred embodiment of a projector according to the invention.
Figure 3:
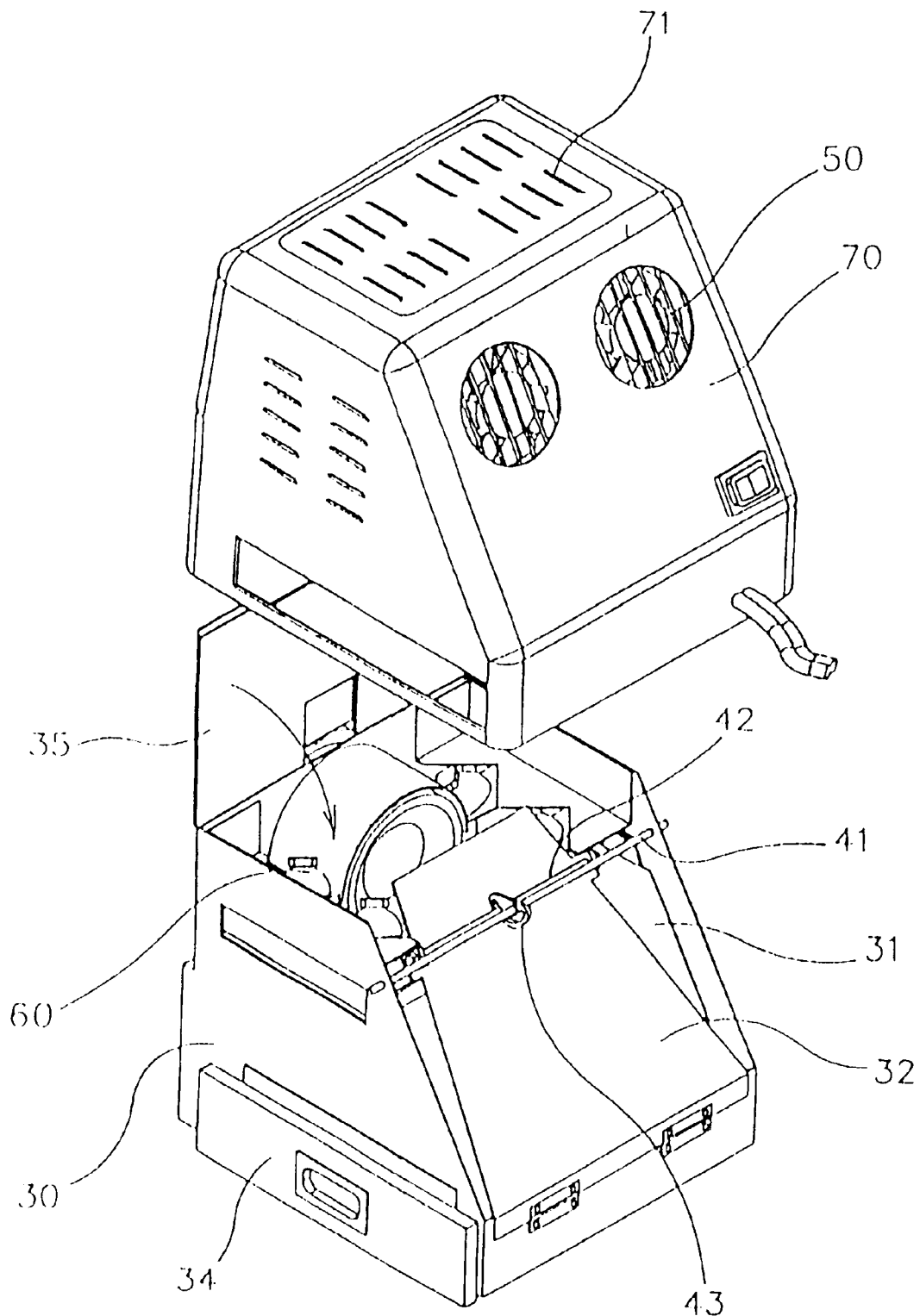
FIG. 3 is another exploded view of the projector of FIG. 2.

Referring to FIGS. 2 and 3, there is shown a projector 20 constructed in accordance with the invention comprising a base 30, an angle adjustment means 40, a cooling means 50, a light source 60, and a housing 70. Details of each above component is as follow.

Base 30 is implemented as a case. Base 30 comprises a mirror 31 on either side, two second small mirrors 311 on both top and bottom sides of each mirror 31, small mirror 311 being at an oblique angle with respect to mirror 31, a rear trapezoidal slanted plate 32 with lower portion hinged to the bottom plate of base 30 such that the rear slanted plate 32 may pivot about the hinge, a third mirror 321 on the inner surface of the rear slanted plate 32, a lens 33 in the front board, an arcuate heat resistant plate 331 above the lens 33, and a drawer 34 in the receiving space of the base 30 for putting object(s) therein.

Angle adjustment means 40 comprises an elongate shaft 41 with both ends passed through the sides of base 30, a turning member 43 (e.g., cam) pivotably put on the shaft 41 having an arcuate recess 431, and a short shaft 42 passed through the arcuate recess 431 having both ends attached to the outer surface of the rear slanted plate 32.

Light source 60 is provided on upper portion of base 30. Light source 60 consists of a plurality of high power lamps (e.g., halogen lamps, mercury-vapor lamps, etc.). The emitted rays of light is concentrated on side mirrors 31. Referring to FIG. 3 specifically, a cover 35 is hinged on the front board of base 30. A maintenance of the elements of projector 20 may be facilitated by opening the cover 35. Housing 70 is shaped to conform with base 30 so as to cover the projector 20. Cooling means 50 are provided on the rear board of housing 70. In this embodiment, cooling means 50 is a fan. Angle adjustment means 40 is provided on the outside of the rear slanted plate 32 for adjusting the angle of the rear slanted plate 32 with respect to base 30, thereby improving the efficiency of reflected light.

Figure 1:
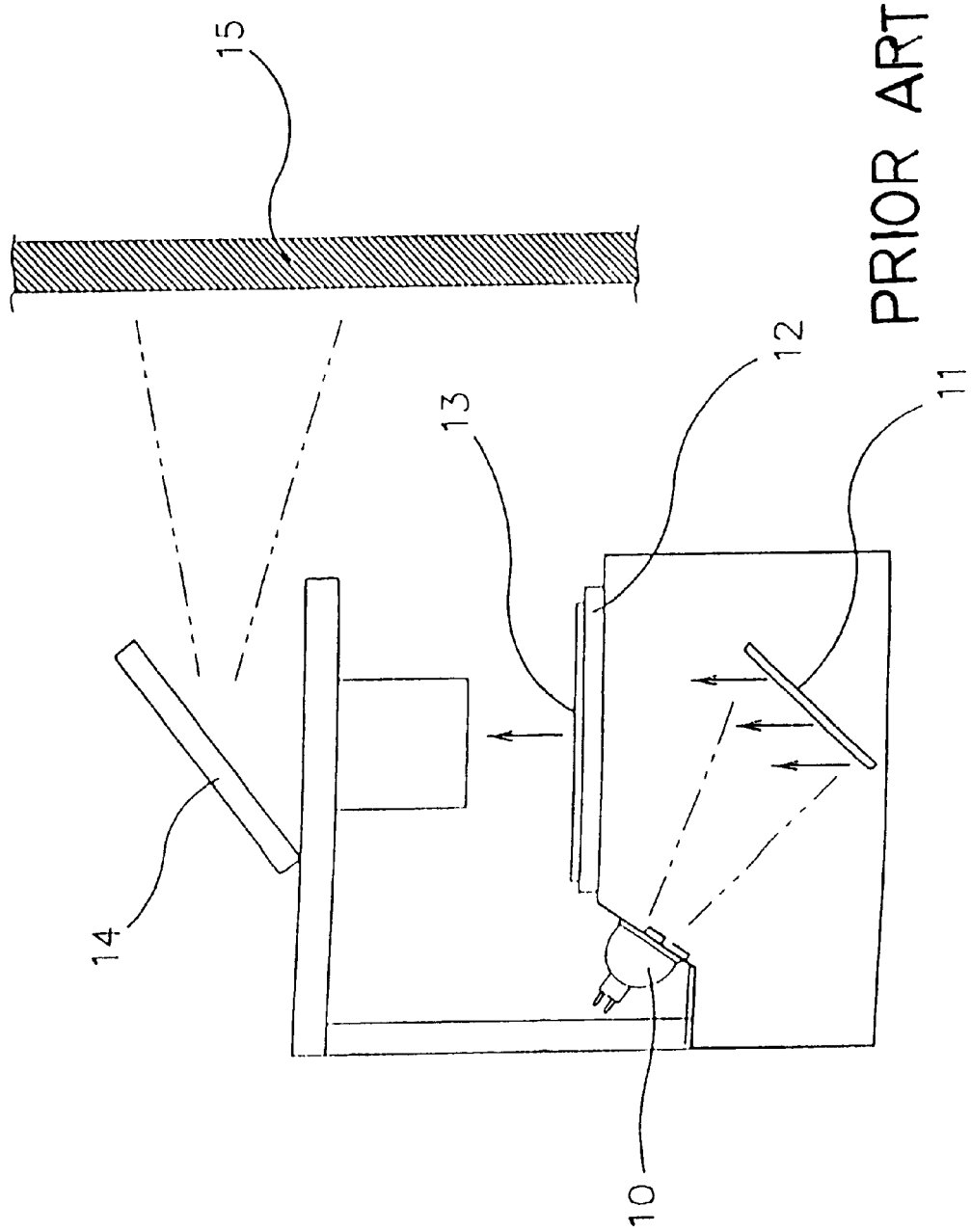
FIG. 1 is a side view schematically showing a conventional projector.
Figure 4:
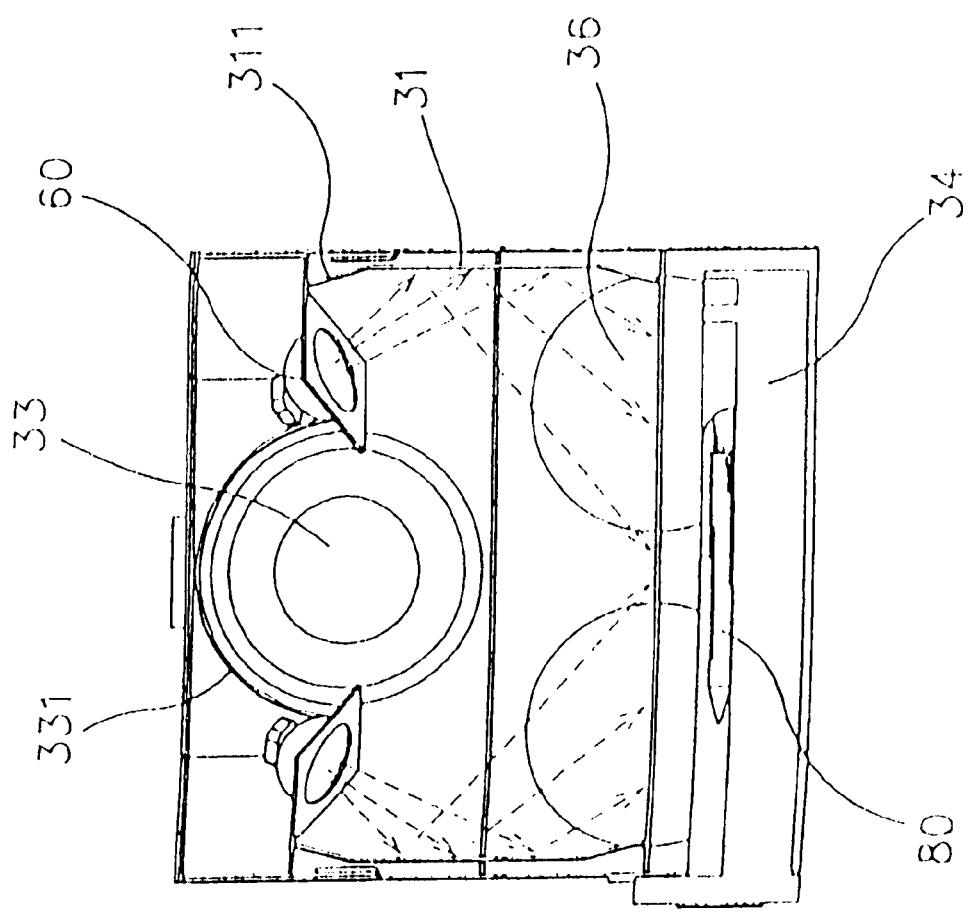
FIG. 4 is a front view of the projector of FIG. 2 with housing removed for schematically illustrating the operation principles according to the invention.
Figure 5:
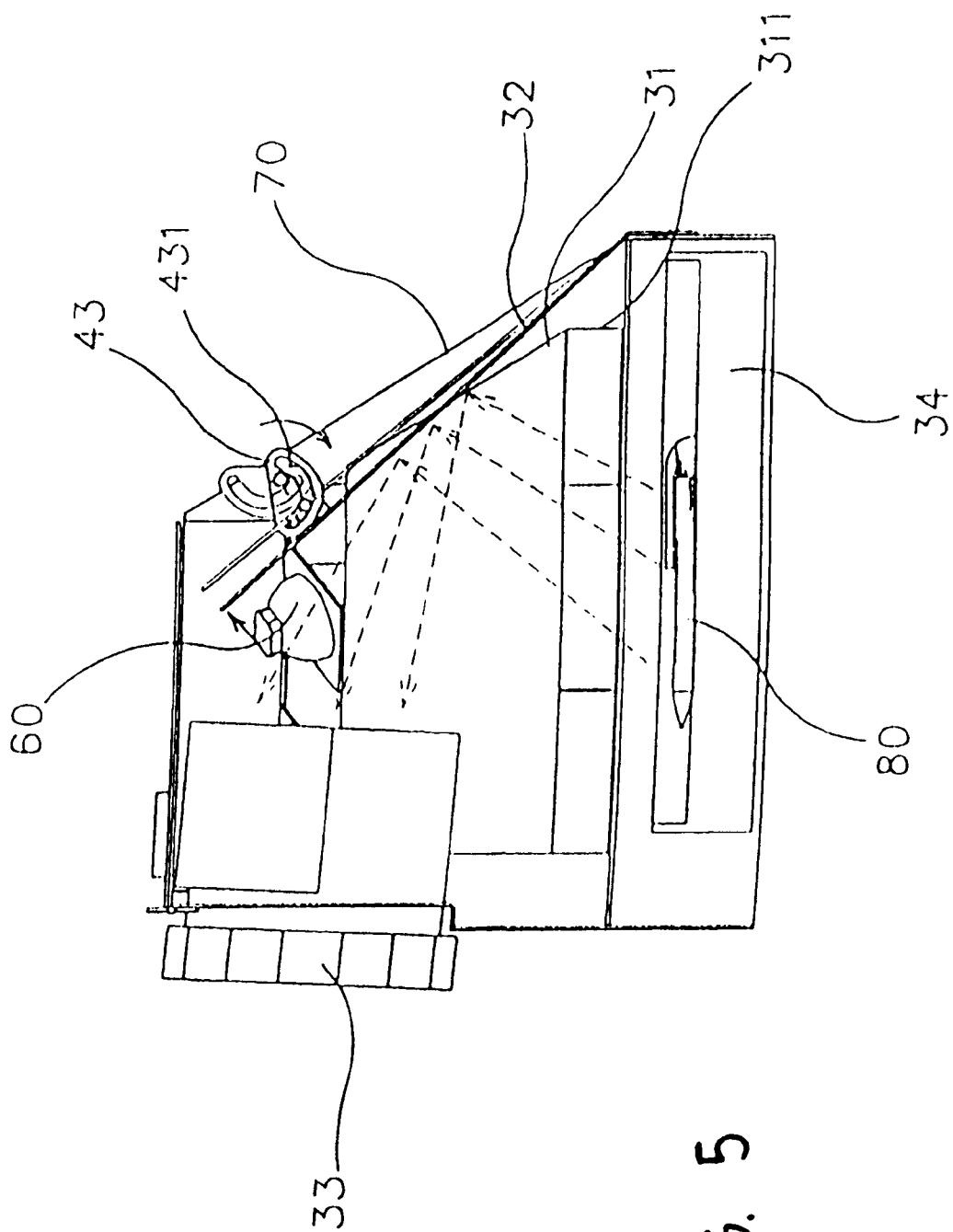
FIG. 5 is a side view of the projector of FIG. 2 with housing removed for schematically illustrating the angle adjustment according to the invention.

Referring to FIGS. 4 and 5 in conjunction with FIG. 1, the operation principles and angle adjustment according to the invention are illustrated. Object 80 is put on the drawer 34 which is inserted in the receiving space of base 30 from opening 312. As stated above, the emitted light from light source 60 is concentrated on side mirrors 31. The image of object 80 is reflected on third mirror 321 (see FIG. 5). Next, above image is reflected on lens 33 in the front board of base 30. User may turn a focusing knob (not shown) associated with the lens 33 for obtaining a clear image on the screen.

In adjusting angle, pivot the cam 43 toward short shaft 42 in order to bias the rear slanted plate 32 for adjusting the angle of the rear slanted plate 32. The purpose of angle adjustment is to obtain a better angle of the lens 33 for enhancing focus. Further, second small mirrors 311 on both top and bottom sides of each mirror 31 may enhance the reflectivity of projected object 80.

Figure 6:
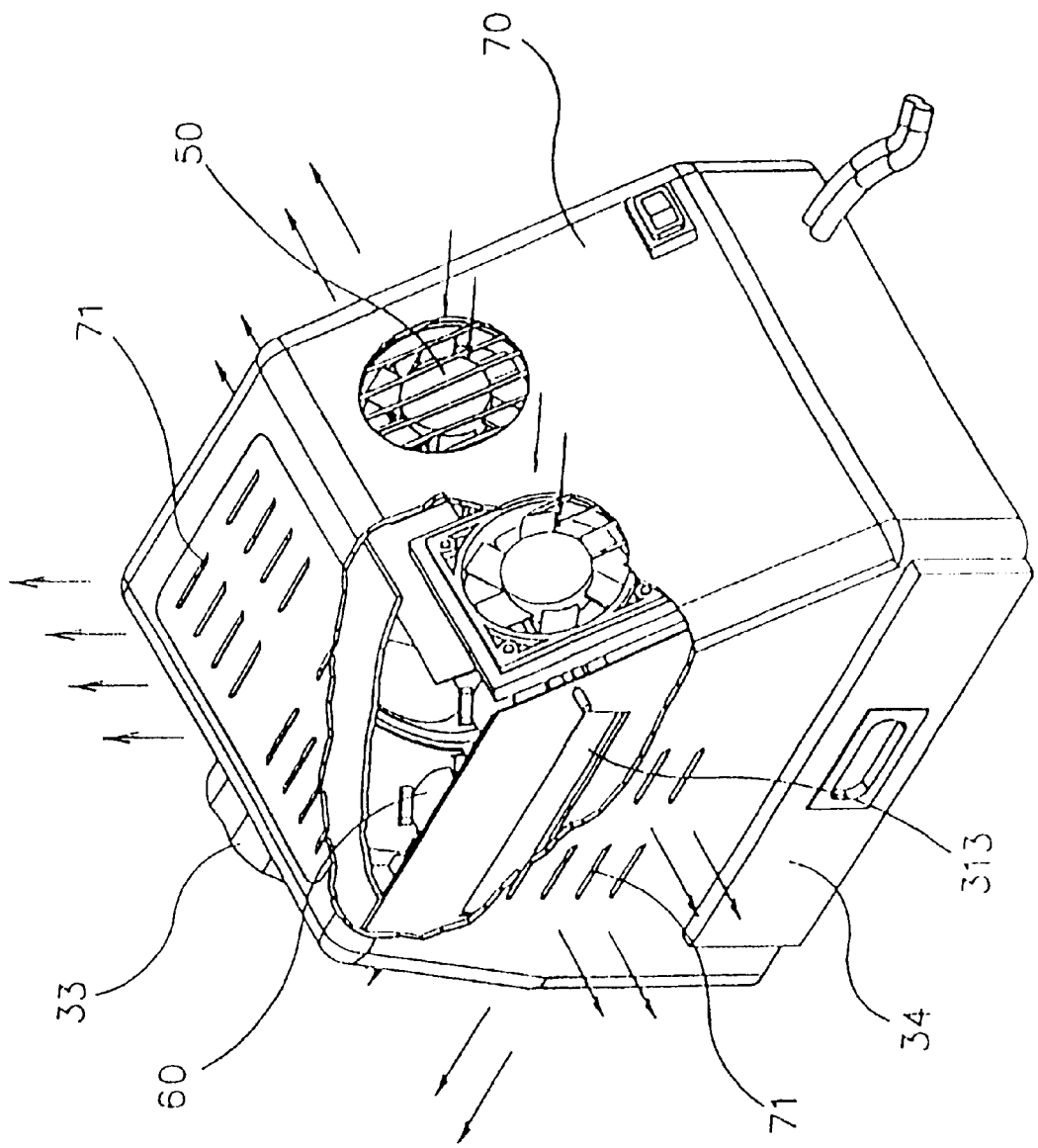
FIG. 6 is a perspective view in part section of the projector of FIG. 2.

Referring to FIG. 6, there is shown a ventilation opening 313 on either side of base 30 in addition to the ventilation openings 36 on the front side of base 30 shown in FIG. 2. Also, two sets of ventilation slots 71 corresponding to ventilation openings 313 are provided on two side boards of the housing 70 and a set of ventilation slots 71 is on the top board of housing 70 respectively. These ventilation openings and slots 313 and 71 may effectively dissipate heat generated in use so as to maintain the normal operation of projector 20.

While the invention herein disclosed has been described by means of specific embodiments, numerous modifications and variations could be made thereto by those skilled in the art without departing from the scope and spirit of the invention set forth in the claims.

What is claimed is:

1. A projector capable of throwing image on a screen from at least one object, the projector comprising:

a base including a first mirror on either side, a rear slanted plate with lower portion hinged to the bottom, a second mirror on the inner surface of the rear slanted plate, a lens in a front board, and a drawer removably disposed in the base for receiving the object;

an angle adjustment means on the outside of the rear slanted plate for adjusting the angle of the rear slanted plate with respect to the base including a first shaft with both ends passed through the sides of the base, a turning member pivotably put on the first shaft having an arcuate recess, and a second shaft shorter than the first shaft passed through the arcuate recess having both ends attached to the outer surface of the rear slanted plate;

a light source on the upper portion of the base for emitting light toward the first mirrors of the base;

a housing shaped to conform with the base so as to cover the projector; and a cooling means on the rear of the housing;

wherein in use, the object is put on the drawer, the image of the object is reflected on the third mirror, and the image is further reflected on the lens of the base prior to throwing on the screen; and in adjusting the angle of the rear slanted plate, pivot the turning member toward the second shaft for biasing the rear slanted plate.

2. The projector of claim 1, wherein the cooling means is a fan.

3. The projector of claim 1, wherein the slanted plate has a trapezoidal shape.

4. The projector of claim 1, wherein the base further comprises two third mirrors on the top and the bottom sides of each first mirror respectively, each third mirror being smaller than the first mirror.

5. The projector of claim 4, wherein the third mirror is at an oblique angle with respect to the first mirror.

6. The projector of claim 1, wherein the turning member is a cam.

7. The projector of claim 1, wherein the base further comprises a first ventilation opening on either side and two second ventilation openings on the front side, and the housing comprises two sets of first ventilation slots on both sides corresponding to the first ventilation openings and one set of second on the top.

8. The projector of claim 1, wherein the base further comprises a cover hinged to the front side.

9. The projector of claim 1, wherein the base further comprises an arcuate heat resistant plate above the lens.

* * * * *